United States Patent [19]

Zach, Jr.

[11] 4,015,486
[45] Apr. 5, 1977

[54] POWER SHIFT TRANSMISSION

[75] Inventor: George O. Zach, Jr., Hales Corners, Wis.

[73] Assignee: Allis-Chalmers Corporation, Milwaukee, Wis.

[22] Filed: Dec. 19, 1974

[21] Appl. No.: 534,555

[52] U.S. Cl. .................................... 74/753; 74/770
[51] Int. Cl.² ...................... F16H 3/44; F16H 57/10
[58] Field of Search ............ 74/770, 753, 764, 789, 74/762, 763, 705

[56] References Cited

UNITED STATES PATENTS

| | | | |
|---|---|---|---|
| 2,821,869 | 2/1958 | Kelbel | 74/770 X |
| 3,010,343 | 11/1961 | Orr et al. | 74/753 |
| 3,664,210 | 5/1972 | Laing | 74/753 |

Primary Examiner—Leonard H. Gerin
Attorney, Agent, or Firm—Arthur L. Nelson

[57] ABSTRACT

A power shift transmission having dual planetary gearsets with hydraulic brake and clutches for selective transmission of power through either or both of the planetary gearsets to provide three forward and one reverse speed through the transmission.

10 Claims, 3 Drawing Figures

| GEAR | CLUTCHES | RATIO | %CHANGE |
|---|---|---|---|
| REV. | 29-89 | -1.667 | |
| 1 | 54-89 | 1.559 | |
| 2 | 54-73 | 1.289 | 21.0% |
| 3 | 89-73 | 1.00 | 28.9% |

POWER SHIFT TRANSMISSION

BACKGROUND OF THE INVENTION

This invention relates to a planetary transmission and more particularly to a power shift transmission having dual planetary gearsets with a brake and clutches for selectively shifting power paths through the transmission to provide three forward speeds and one reverse speed.

Vehicle transmissions used on tractors provide a plurality of forward speeds and at least one reverse speed. Because of the variation in draft load which is applied to the tractors it is desirable to have a means of shifting the transmission speed ratio up or shifting the transmission speed ratio down while the tractor is in motion. This is desirable because the draft load on the tractor varies with soil conditions, wheel traction, unevenness of the terrain. If the tractor were stopped to shift gears, it is possible the tractor will never be able to be started again because of the failure of traction particularly where the soil is soft and the traction may be scarcely adequate to keep the vehicle traveling. Accordingly, a vehicle transmission which can shift up or shift down while the vehicle is traveling will supply continuous power to the wheels and maintain the momentum of the tractor and allow the tractor to get over the area where the wheel slippage is at a maximum tolerable rate.

Accordingly, this invention provides a three speed transmission with three forward speeds and one reverse speed. The transmission is a power shift transmission in which the elements of the planetary gearsets may be selectively engaged or disengaged while the vehicle is in motion. Only one of the clutches or the brake is changed to provide a selectively different speed ratio of higher or lower gear ratio as desired. As the one clutch or brake is disengaged, another clutch or brake is engaged to provide smooth transition of power from the one clutch to the other clutch to increase or decrease the speed ratio of the gears in the transmission as desired. Accordingly, the vehicle transmission can be shifted to continue the forward movement of the vehicle without losing momentum and to provide continued power to maintain the drawbar traction as needed. The relative speed of adjacent clutch friction members is low so that the transition of power from one ratio to another does not cause roughness as the transmission is shifted from one clutch to another. A suitable pressure modulating means is provided to selectively engage one of the hydraulic actuators operating a brake or clutch while the other hydraulic actuator is disengaged.

The transmission is adapted for operation with a range transmission which may be a mechanically shifted transmission in series with the power shift transmission. In other words, a selected speed of the range transmission can be mechanically shifted while the vehicle is stationary and then the increase or decrease of the speed ratios in the power shift transmission can be shifted while the tractor is in motion.

It is an object of this invention to provide a dual planetary power shift transmission having three forward and one reverse speed.

It is another object of this invention to provide a dual planetary transmission for transmission of power through either or both of the planetary gearsets and selectively shift the transmission while the transmission is in operation.

It is a further object of this invention to provide a dual planetary power shift transmssion with an input shaft driving the ring gear of one planetary gearset and the sun gear of the other planetary gearset with selective output from the ring gear of one planetary gearset and the planetary carriers of the two planetary gearsets.

The objects of this invention are accomplished by providing two planetary gearsets having sun gears rotating on a common axis of rotation, each planetary gearset includes a sun gear, a ring gear and a plurality of planet gears with a planetary carrier. The sun gear of the first planetary gearset is connected to the transmission housing. The input shaft is rotatably mounted for rotation on the common axis with the sun gears of the planetary gearsets and is connected to the ring gear of the first planetary gearset and the sun gear of the second planetary gearset. A torque transmitting member rotates about said common axis and can be selectively braked to the transmission housing or selectively clutched to the planetary carrier of the first planetary gearset to transmit power to the planetary carrier of the second planetary gearset or the output shaft. The output shaft rotates about said common axis and is carried on the clutch carrier. The clutch carrier carries clutches for selective engagement with the ring gear of the second planetary gearset and the planetary carrier of the second planetary gearset to transmit power to the output shaft. Accordingly, selective power shifting provides braking or clutching of the torque transmitting member and clutching of the clutch carrier with transition of no more than one of the brakes or clutches to vary the speed ratio and provide three forward and one reverse speed of the transmission.

The preferred embodiment of the invention is illustrated in the attached drawings.

Figure 1:
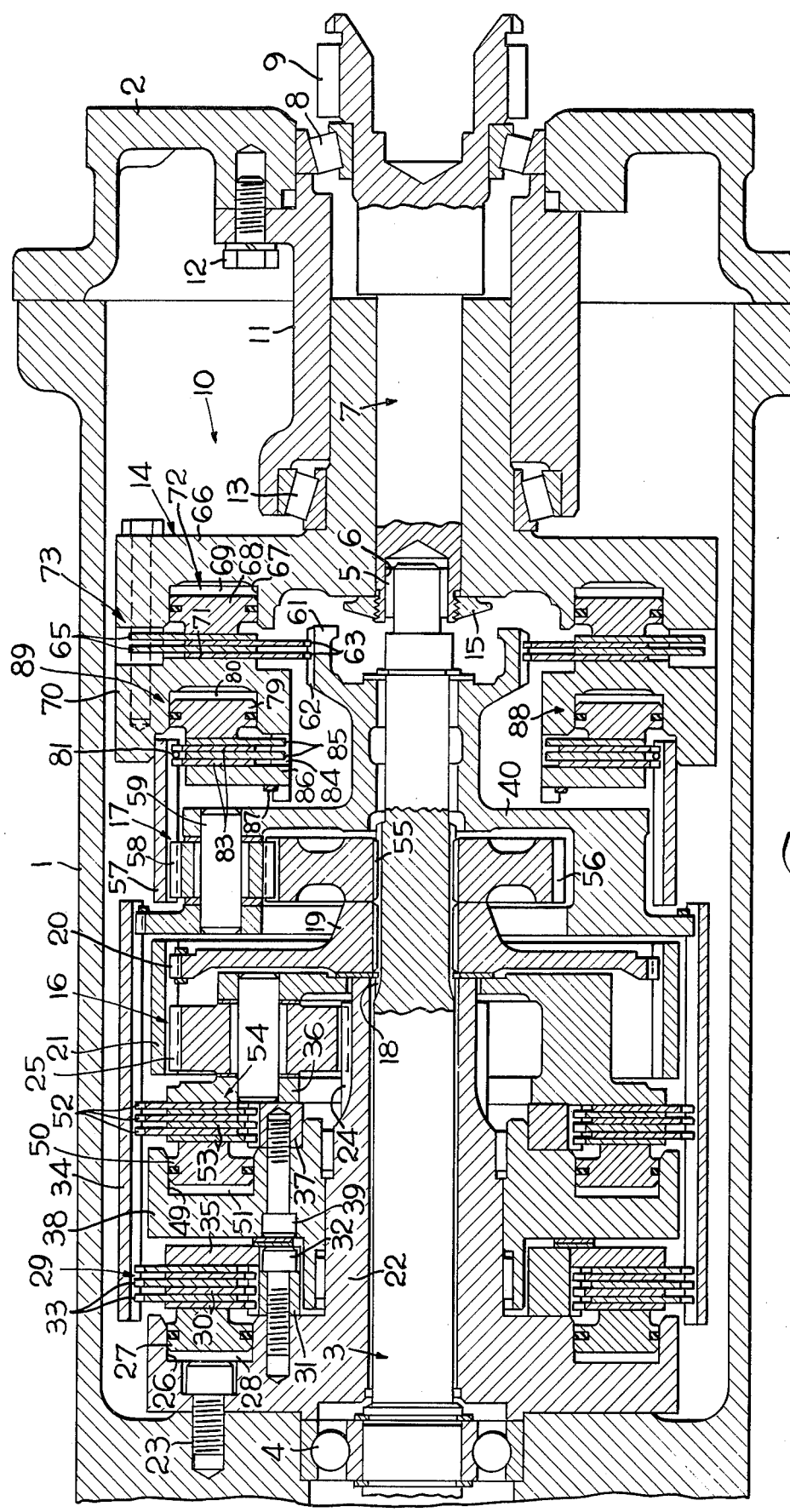
FIG. 1 illustrates a cross-section view of the transmission.

FIG. 1 illustrates a power shift transmission with dual planetary gearsets shown in cross-section. The transmission housing 1 houses the transmission. The cover plate 2 is fastened to the transmission housing 1 by suitable fastened means. The input shaft 3, is rotatably mounted in the bearing assembly 4 and extends axially through the transmission, where it is supported in a bearing assembly 5 retained within the central opening 6 of the end of the output shaft 7. The output shaft 7 is supported by the bearing assembly 8 mounted in cover 2 and bearing assembly 13 mounted in bearing retainer 11. The output shaft 7 forms a gear 9 adapted for transmitting power output from the transmission 10. Fastened to the end cover 2 is a bearing retainer 11 which is fastened to the cover plate 2 by a plurality of bolts 12 of which one is shown. The bearing retainer 11 embraces the bearing assembly 13 which rotatably supports the clutch carrier 14. The clutch carrier 14 is fastened to the output shaft 7 by the nut 15 which threadedly engages the left hand end of the output shaft 7.

Brake sleeve 22 forms the sun gear 24 and carries a first planetary gearset 16. The second planetary gearset 17 is carried on the input shaft 3. The input shaft is connected by the spline connection 18 to hub 19 which is formed with spline 20 which engages the ring gear 21 of the first planetary gearset 16.

The brake sleeve 22 is fastened by a plurality of bolts 23, of which one is shown, to the transmission housing 1. The sun gear 24 engages a plurality of planet gears 25 which also engage the ring gear 21.

A brake sleeve 22 forms a hydraulic cylinder 26. The brake piston 27 is received within a brake cylinder 26 to form a pressurizing chamber 28 connected to suitable passage means for actuating the brake 29. A plurality of stator discs 30 are connected by a spline connection to the stator 31 by means of a plurality of bolts 32 and the stator is connected to the brake sleeve 22. The rotor discs 33 are connected by a spline connection to the torque transmitting member 34. The discs 30 and 33 are compressed against the reaction plate 35 when the brake 29 is actuated.

The planetary carrier 36 of the first planetary gearset 16 carries the planet gears 25. The clutch hub 37 is connected to a rotor 38 by means of a plurality of bolts 39 of which one is shown. The rotor 38 forms a hydraulic cylinder 49. The hydraulic cylinder 49 receives a hydraulic piston 50 and forms a pressurizing chamber 51. Torque transmitting member 34 carries the clutch discs 52 while the clutch hub 37 carries the clutch discs 53. The clutch discs 52 and 53 are compressed against the planetary carrier 36 of the first planetary gearset 16 when the hydraulic clutch 54 is actuated.

The input shaft 3 is connected by the spline connection 55 to the sun gear 56 of the second planetary gearset 17. The ring gear 57 engages a plurality of planet gears 58 of the second planetary gearset 17. Each of the planet gears 58 are carried on a pin 59 of the planetary carrier 40. The carrier 40 also carries the torque transmitting member 34.

The clutch hub 61 is integral with the planetary carrier of the second planetary gearset 17 and forms a spline 62 which caries a plurality of clutch discs 63. The clutch carrier 14 also carries a plurality of clutch discs 65. The clutch carrier 14 includes a rotor 66 which forms a hydraulic cylinder 67. The hydraulic cylinder 67 receives a piston 68 and forms a pressurizing chamber 69. The back of the hydraulic cylinder 70 forms a reaction surface 71 for the compression of the discs 65 and 63, when the hydraulic actuator 72 of the clutch 73 is actuated.

The hydraulic cylinder 70 receives a piston 79 to form a pressurizing chamber 80 for actuation of a clutch 89. Snap ring 81 in ring gear 57 and between discs 83 locates the ring gear 57 relative to the clutch 89. A ring gear 57 carries clutch discs 83 while the spline portion 84 formed on the hydraulic cylinder 70 carries the clutch discs 85. The reaction plate 86 is held in position by a snap ring 87 and receives the force of the actuation of the hydraulic actuator 88 when a clutch 89 is actuated.

Figures 2, 3:
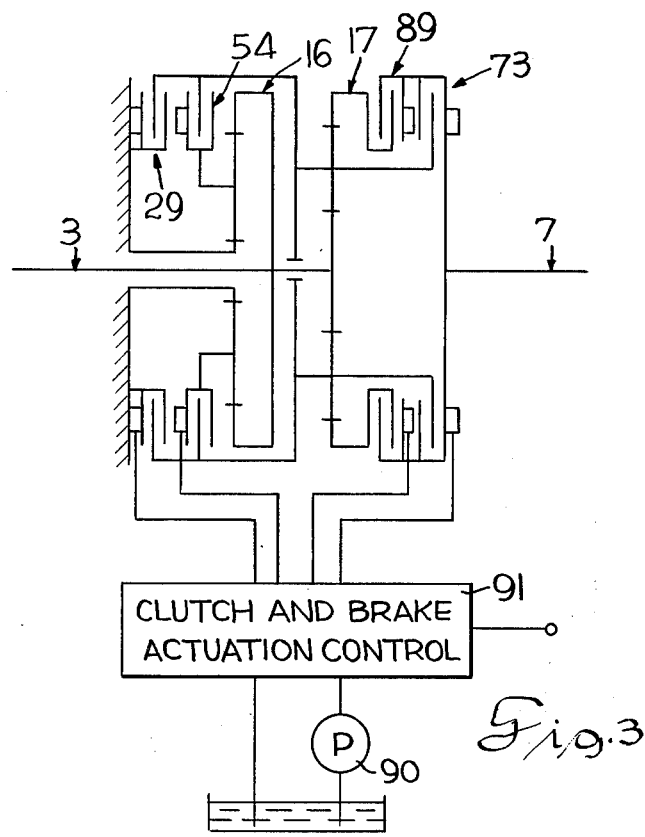
FIG. 2 illustrates a table showing the torque ratios, the clutches and brake engaged, as well as the percentage of torque change for the prior torque ratio.
FIG. 3 is a diagram of the power shift transmission with hydraulic fluid actuating means.

FIG. 2 shows the speed ranges of the transmission, and clutches and brake engaged to provide the speed ranges as indicated. The torque ratios are also shown in the third column and the percentage of change in torque ratio to the preceding torque ratio is also indicated.

FIG. 3 illustrates a schematic diagram of a transmission to more clearly illustrate the connection between the components of two planetary gearsets with the brake and clutches of the transmission. The pump 90 supplies pressurized fluid to the clutch and brake actuation control 91 for operation in the hydraulic system.

The operation of the transmission will be described in the following paragraphs:

The dual planetary power shift transmission as shown includes the planetary gearsets 16 and 17. The first planetary gearset has its sun gear connected to the transmission housing. The input shaft 3 is connected to the ring gear 21 on the first planetary gearset 16 and the second sun gear 56 of the second planetary gearsets 17. The planetary carrier 36 of the first planetary gearset 16 and the planetary carrier 40 of the second planetary gearset 17 can be braked to the transmission housing. A planetary carrier 36 of the first planetary gearset 16 can also be clutched to the output shaft 7. The ring gear and the planetary carrier of the second planetary gearset 17 can be clutched to the output shaft 7.

When the transmission is placed in reverse the brake 29 is actuated whereby the planetary carrier 40 of the second planetary gearset 17 is locked to the housing. The clutch 89 is engaged connecting the ring gear 57 to the output shaft 7 and the output of the transmission is driven in reverse.

When the planetary carrier 36 of front planetary gearset 16 is clutched to the torque transmitting member 34 as the clutch 89 is engaged, the ring gear 57 drives the output shaft 7 in the first gear ratio.

When the clutch 54 is engaged the planetary carrier 36 of the front planetary gearset 16 is connected through the torque transmitting member 34 to the planetary carrier 40 of the rear planetary gearset. When the clutch carrier 14 is connected to the planetary carrier 40 of the rear planetary gearset through clutch 73, the transmission is in the second forward speed.

When the planetary carrier 40 of the second planetary gearset 17 is connected through the clutch 73 to the output shaft 7 and the ring gear 57 of the second planetary gearset 17 is connected through the clutch 89, to the output shaft, the rear planetary gearset 17 is locked and the input shaft 3 drives directly through the output shaft 7 and the transmission is in high speed.

The embodiments of the invention in which an exclusive property or privilege is claimed are defined as follows:

1. A planetary transmission comprising a transmission housing, a first planetary gearset and a second planetary gearset each having a sun gear mounted on a common axis, each planetary gearset including a sun gear, a ring gear, a planetary carrier, and planet gears mounted on the planetary carrier, an input shaft rotatably mounted for rotation about said common axis, means integrally connecting said input shaft to the ring gear of said first planetary gearset and the sun gear of said second planetary gearset, an output shaft rotatably mounted for rotation about said common axis, means integrally connecting the sun gear on said first planetary gearset to said transmission housing, a torque transmitting member interconnected with the planetary carrier of said second planetary gearset, a brake mounted on said transmission housing, a clutch selectively connecting said planetary carrier of said first planetary gearset with said torque transmitting member, a friction member in each of said brake and said clutch connected to said torque transmitting member, a clutch carrier integrally connected to said output shaft and mounted for rotation about said common axis, a plurality of clutches carried on said clutch carrier, a friction member carried on each of said ring gear and said planetary carrier of said second planetary gearset forming an element in each of said clutches in said clutch carrier, hydraulic means for selectively and alternatively actuating said brake and clutches to thereby selectively provide a plurality of power paths through said planetary gearsets in said transmission when said brake or clutches are engaged.

2. A planetary transmission as set forth in claim 1, including means engaging said brake for braking said friction member, said torque transmitting member with transmission housing, means for engaging said clutch for clutching said friction member connected to the ring gear of said second planetary gearset to said clutch carrier and said output shaft to thereby provide a reverse rotation of said output shaft in said transmission.

3. A planetary transmission as set forth in claim 1 including means engaging said friction member of said torque transmitting member with said clutch on the planetary carrier of said first planetary gearset, means engaging a friction member on said ring gear of said second planetary gearset and said one clutch on said clutch carrier to thereby provide a first forward speed of said transmission.

4. A planetary transmission as set forth in claim 1 including means engaging said friction member on said torque transmitting member with said planetary carrier of said first planetary gearset, means engaging said friction member on said planetary carrier on said second planetary gearset with the one of said clutches on said clutch carrier to provide operation of said transmission in the second forward speed.

5. A planetary transmission as set forth in claim 1 including means engaging the friction member connected to the ring gear of said second planetary gearset with the clutch on said clutch carrier, means engaging the friction member on said planetary carrier of said second planetary gearset with the clutch carrier to thereby provide operation of said transmission in the third forward speed.

6. A planetary transmission as set forth in claim 1 including a mounting sleeve connecting said housing to the sun gear of said first planetary gearset for carrying the sun gear, means connecting and supporting the ring gear of said first planetary gearset on said input shaft.

7. A planetary transmission as set forth in claim 1 wherein said torque transmitting member defines a drum.

8. A planetary transmission as set forth in claim 7 wherein said drum provides a housing enclosing said first planetary gearset.

9. A planetary transmission as set forth in claim 1 wherein said clutch carrier defines a drum.

10. A planetary transmission as set forth in claim 9 wherein said drum defines the housing enclosing said second planetary gearset.

* * * * *